US012621446B2

(12) United States Patent
Karczewicz et al.

(10) Patent No.: US 12,621,446 B2
(45) Date of Patent: May 5, 2026

(54) ADAPTIVE VIDEO FILTER CLASSIFIER METHODS

(71) Applicant: QUALCOMM Incorporated, San Diego, CA (US)

(72) Inventors: Marta Karczewicz, San Diego, CA (US); Vadim Seregin, San Diego, CA (US); Nan Hu, San Diego, CA (US); Ikram Jumakulyyev, Gröbenzell (DE)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 18/543,641

(22) Filed: Dec. 18, 2023

(65) Prior Publication Data

US 2024/0223758 A1     Jul. 4, 2024

Related U.S. Application Data

(60) Provisional application No. 63/478,333, filed on Jan. 3, 2023.

(51) Int. Cl.
*H04N 19/00* (2014.01)
*H04N 19/117* (2014.01)
(Continued)

(52) U.S. Cl.
CPC ......... *H04N 19/117* (2014.11); *H04N 19/119* (2014.11); *H04N 19/124* (2014.11);
(Continued)

(58) Field of Classification Search
None
See application file for complete search history.

(56) References Cited

U.S. PATENT DOCUMENTS

2012/0300850 A1*  11/2012  Yie ......................... H04N 19/44
                                                    375/E7.256
2018/0020215 A1*   1/2018  Ramamurthy ....... H04N 19/172
                          (Continued)

FOREIGN PATENT DOCUMENTS

EP           3720129 A1    10/2020
WO       2011096770 A2     8/2011

OTHER PUBLICATIONS

Chang Y-J., et al., "Compression Efficiency Methods Beyond VVC", JVET-U0100, Joint Video Experts Team (JVET) of ITU-T SG 16 WP 3 and ISO/IEC JTC 1/SC 29, 21st Meeting, by Teleconference, Jan. 6-15, 2021, XP030293237, Dec. 31, 2020, pp. 1-13, sections 3.2 and 3.3, abstract, Section 5.
                          (Continued)

*Primary Examiner* — Zhihan Zhou
(74) *Attorney, Agent, or Firm* — Shumaker & Sieffert, P.A.

(57)     ABSTRACT

A method and apparatus for coding video data includes filtering video data using a loop filter, such as an adaptive loop filter (ALF), that is determined using a classifier from a plurality of classifiers. A video coder may reconstruct a block of video data to generate a reconstructed block, determine a filter class for the reconstructed block using a classifier from a plurality of classifiers, wherein the plurality of classifiers includes one or more of a first classifier based on a geometry partition and a second classifier based on a histogram of gradients, determine a filter based on the filter class, and apply the filter to the reconstructed block.

24 Claims, 9 Drawing Sheets

(51) Int. Cl.

| | |
|---|---|
| *H04N 19/119* | (2014.01) |
| *H04N 19/124* | (2014.01) |
| *H04N 19/132* | (2014.01) |
| *H04N 19/136* | (2014.01) |
| *H04N 19/176* | (2014.01) |

(52) U.S. Cl.
CPC ......... *H04N 19/132* (2014.11); *H04N 19/136* (2014.11); *H04N 19/176* (2014.11)

(56) References Cited

U.S. PATENT DOCUMENTS

| | | | | |
|---|---|---|---|---|
| 2021/0218962 | A1* | 7/2021 | Lim ..................... | H04N 19/186 |
| 2022/0394248 | A1* | 12/2022 | Deng ..................... | H04N 19/70 |
| 2025/0254321 | A1* | 8/2025 | Tsai ..................... | H04N 19/593 |

OTHER PUBLICATIONS

Chen J., et al., "Algorithm Description for Versatile Video Coding and Test Model 6 (VTM 6)", JVET-O2002-v2, Joint Video Experts Team (JVET) of ITU-T SG 16 WP 3 and ISO/IEC JTC 1/SC 29/WG 11, N18693, 15th Meeting, Gothenburg, SE, Jul. 3-12, 2019, XP030221926, 88 Pages.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A1001, Feb. 24, 2016 (Feb. 24, 2016), XP030150000, 27 Pages, URL: http://phenix.int-evry.fr/jvet/.

Coban M., et al., "Algorithm Description of Enhanced Compression Model 10 (ECM 10)", JVET-AE2025, Joint Video Experts Team (JVET) of ITU-T SG 16 WP 3 and ISO/IEC JTC 1/SC 29 31st Meeting, Geneva, CH, Jul. 11-19, 2023, pp. 1-81.

Coban M., et al., "Algorithm Description of Enhanced Compression Model 7 (ECM 7)", JVET-AB2025, Joint Video Experts Team (JVET) of ITU-T SG 16 WP 3 and ISO/IEC JTC 1/SC 29, 28th Meeting, Mainz, DE, Oct. 20-28, 2022, pp. 1-63.

International Search Report and Written Opinion—PCT/US2023/084881—ISA/EPO—Mar. 5, 2024.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Karczewicz M., et al., "VVC In-Loop Filters", IEEE Transactions on Circuits and Systems for Video Technology, vol. 31, No. 10, Oct. 2021, pp. 3907-3925.

* cited by examiner

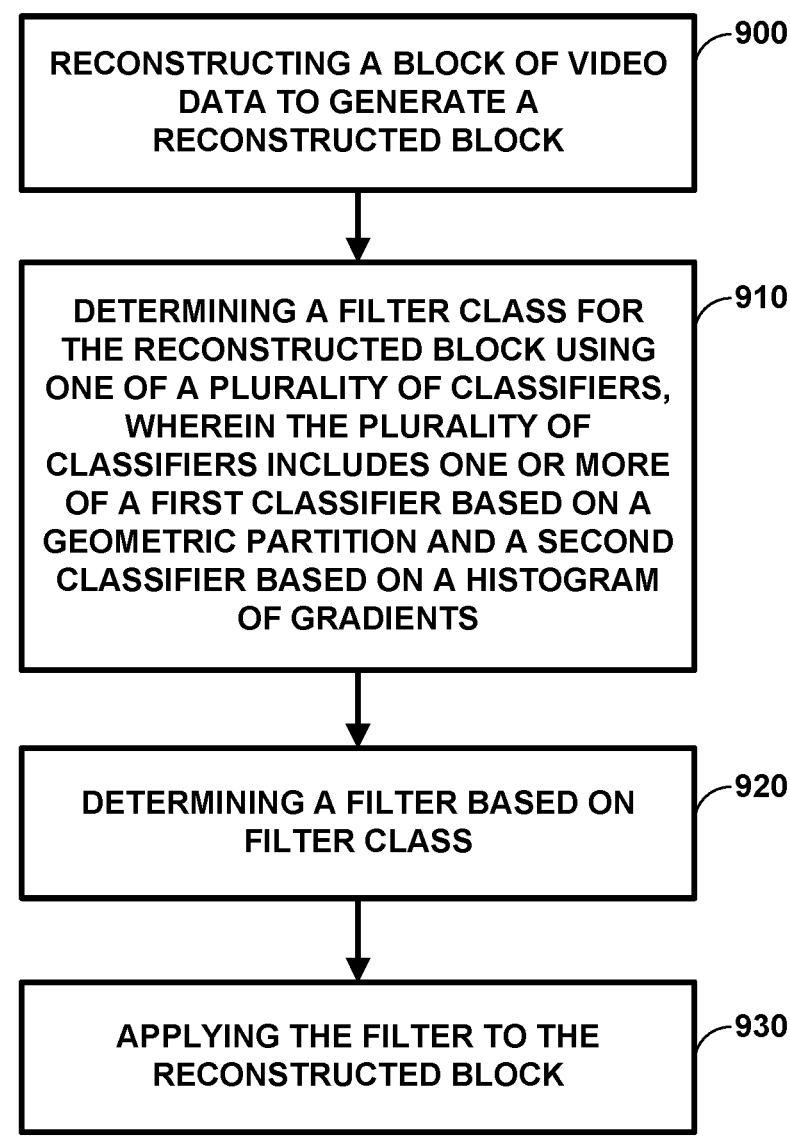

RECONSTRUCTING A BLOCK OF VIDEO DATA TO GENERATE A RECONSTRUCTED BLOCK ⟋900

DETERMINING A FILTER CLASS FOR THE RECONSTRUCTED BLOCK USING ONE OF A PLURALITY OF CLASSIFIERS, WHEREIN THE PLURALITY OF CLASSIFIERS INCLUDES ONE OR MORE OF A FIRST CLASSIFIER BASED ON A GEOMETRIC PARTITION AND A SECOND CLASSIFIER BASED ON A HISTOGRAM OF GRADIENTS ⟋910

DETERMINING A FILTER BASED ON FILTER CLASS ⟋920

APPLYING THE FILTER TO THE RECONSTRUCTED BLOCK ⟋930

FIG. 9

ADAPTIVE VIDEO FILTER CLASSIFIER METHODS

This application claims the benefit of U.S. Provisional Patent Application No. 63/478,333, filed Jan. 3, 2023, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for adaptive loop filtering including techniques for determining classes of adaptive loop filters using classifiers. A video coder may be configured to determine a filter class using a classifier from a plurality of classifiers, including one or more classifiers based on a geometry partition and/or one or more classifiers based on a histogram of gradients (HoG). These classifiers may be more optimally suited for determining the activity of samples in a block for some types of video content, thus making the selection of filters based on a filter class determined from such activity more accurate. As such, video data coded using the techniques of this disclosure may exhibit less distortion.

In one example, a method includes reconstructing a block of video data to generate a reconstructed block, determining a filter class for the reconstructed block using a classifier from a plurality of classifiers, wherein the plurality of classifiers includes one or more of a first classifier based on a geometry partition and a second classifier based on a histogram of gradients, determining a filter based on the filter class, and applying the filter to the reconstructed block.

In another example, a device includes a memory and one or more processors in communication with the memory, the one or more processors configured to reconstruct a block of video data to generate a reconstructed block, determine a filter class for the reconstructed block using a classifier from a plurality of classifiers, wherein the plurality of classifiers includes one or more of a first classifier based on a geometry partition and a second classifier based on a histogram of gradients, determine a filter based on the filter class, and apply the filter to the reconstructed block.

In another example, a device includes means for reconstructing a block of video data to generate a reconstructed block, means for determining a filter class for the reconstructed block using a classifier from a plurality of classifiers, wherein the plurality of classifiers includes one or more of a first classifier based on a geometry partition and a second classifier based on a histogram of gradients, means for determining a filter based on the filter class, and means for applying the filter to the reconstructed block In another example, a computer-readable storage medium is encoded with instructions that, when executed, cause a programmable processor to reconstruct a block of video data to generate a reconstructed block, determine a filter class for the reconstructed block using a classifier from a plurality of classifiers, wherein the plurality of classifiers includes one or more of a first classifier based on a geometry partition and a second classifier based on a histogram of gradients, determine a filter based on the filter class, and apply the filter to the reconstructed block.

The details of one or more examples are set forth in the accompanying drawings and the description below. Other features, objects, and advantages will be apparent from the description, drawings, and claims.

BRIEF DESCRIPTION OF DRAWINGS

FIG. 9 is a flowchart illustrating an example method for encoding or decoding a block of video data in accordance with the techniques of this disclosure.

DETAILED DESCRIPTION

An adaptive loop filter (ALF) is used in the VVC video standard and its improved version is included in the enhanced compression model (ECM). ECM is the H.267 Test Model. In some examples, ALF uses a multitude of Wiener Filters trained offline or sent to the decoder. Which of these filters is applied to a given pixel/sample or group of pixels/samples depends on a classifier which determines a class/filter for these pixels. This disclosure describes two new classifiers which can improve results over currently used Laplacian-based and band-based classifiers.

For example, a video coder may be configured to determine a filter class using a classifier from a plurality of classifiers, including one or more classifiers based on geometry partitioning and/or one or more classifiers based on a histogram of gradients. These classifiers may be more optimally suited for determining the activity and/or directionality of samples in a block for some types of video content, thus making the selection of filters based on a filter class determined from such activity more accurate. As such, video data decoded using the techniques of this disclosure may exhibit less distortion.

Figure 1:
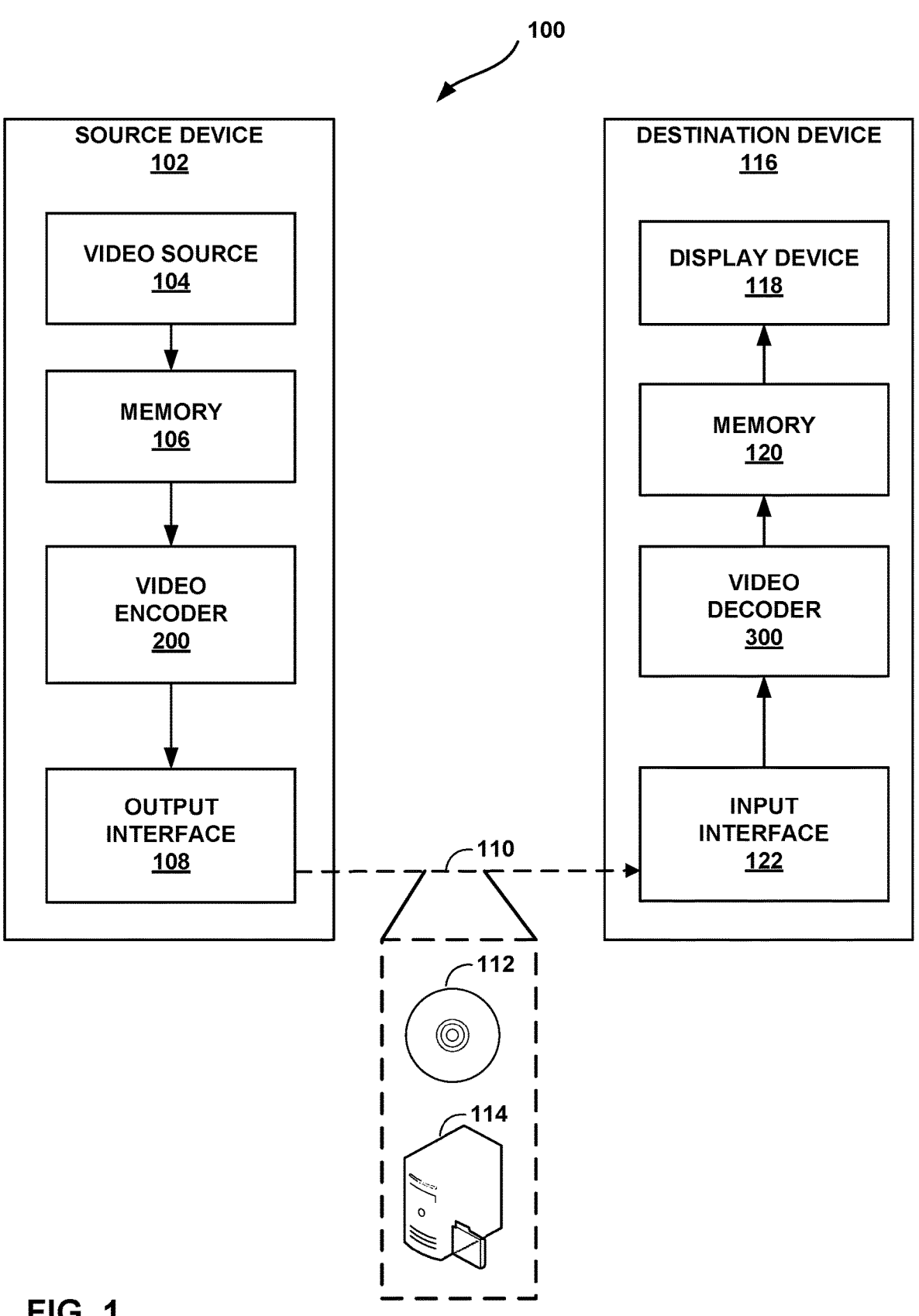
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for adaptive loop filtering. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for adaptive loop filtering. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use adaptive loop filtering.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, as will be explained in more detail below, video encoder 200 and video decoder 300 may be configured to reconstruct a block of video data to generate a reconstructed block, determine a filter class for the reconstructed block using a classifier from a plurality of classifiers, wherein the plurality of classifiers includes one or more of a first classifier based on a geometry partition and a second classifier based on a histogram of gradients, determine a filter based on the filter class, and apply the filter to the reconstructed block.

In example video encoders, a frame of an original video sequence is partitioned into rectangular regions or blocks. The video encoder may encode the blocks using a coding mode, such as intra-mode (I-mode) or inter-mode. The blocks may also be encoded using transform coding, such as DCT coding. Pure transform-based coding only reduces the inter-pixel correlation within a particular block, without considering the inter-block correlation of pixels. Furthermore, pure transform-based coding may still produce high bit-rates for transmission. Current digital image coding standards also exploit certain methods that reduce the correlation of pixel values between blocks.

In general, blocks encoded in inter-mode are predicted from previously coded and transmitted frames. The prediction information of a block can be, for example, represented by a two-dimensional (2D) motion vector. For the blocks encoded in I-mode, the predicted block is formed using spatial prediction from already encoded neighboring blocks within the same frame. The prediction error, i.e., the difference between the block being encoded and the predicted block is represented as a set of weighted basis functions of some discrete transform. The transform is typically performed on an N×M block basis. The weights—transform coefficients—are subsequently quantized. Quantization introduces loss of information and, therefore, quantized coefficients have lower precision than the original coefficients.

Quantized transform coefficients, together with motion vectors and some control information, form a coded sequence representation and are referred to as syntax elements. Prior to transmission from the encoder to the decoder, syntax elements may be entropy coded so as to further reduce the number of bits needed for their representation.

In the decoder, the block in the current frame is obtained by first constructing its prediction in the same manner as in the encoder and by adding the compressed prediction error to the prediction. The compressed prediction error is found by weighting the transform basis functions using the quantized coefficients. The difference between the reconstructed frame and the original frame is called reconstruction error.

In the field of video coding, it is common to apply filtering in order to enhance the quality of a decoded video signal. In one example, a filter can be applied as a post-filter, where the filtered frame is not used for prediction of future frames. In other examples, the filter can be applied as an in-loop filter, where the filtered frame is used to predict future frame. A filter can be designed, for example, by minimizing the error between the original signal and the decoded filtered signal. Similarly, in order to transform coefficients, the coefficients of the filter $h(k, l)$, $k=-K, \ldots, K, l=-K, \ldots K$ are quantized as follows:

$$c(k, l) = \text{round}\,(normFactor \cdot h(k, l))$$

The quantized coefficients may be encoded and sent to the decoder. The normFactor is usually equal to $2^n$. The larger the value of normFactor the more precise the quantization and the quantized filter coefficients $c(k, l)$ provide better performance. On the other hand, larger values of normFactor produce coefficients $c(k, l)$ requiring more bits to transmit.

In the decoder, the decoded filter coefficients $c(k, l)$ are applied to the reconstructed image $R(i, j)$ as follows:

$$\tilde{R}(i, j) = \sum_{k=-K}^{K} \sum_{l=-K}^{K} c(k, l) R(i + k, j + l), \tag{1}$$

where i and j are the coordinates of the pixels within the frame. The filter coefficients can be also applied to the differences $f(k, l)$ between the to-be-filtered sample $R(i, j)$ and its neighboring samples:

$$f(k, l) = R(i + k, j + l) - R(i, j).$$

In this example, the sample $R(x, y)$ is obtained by adding the resulting sum to the reconstructed sample $R(x, y)$. The differences $f(k, l)$ can be modified by, for example, applying clipping.

The Adaptive Loop Filter (ALF) with block-based adaption in VVC is one example of an in-loop filter. In the ALF of VVC, sub-block or pixel level filter adaptation is applied. In VVC, each M×M block is categorized into one class of 25 classes (C) based on the directionality (D) of the block and a quantized value of activity (A) of the block, where $C=5D+A$. Each class (C) can have its own assigned filter. For example, video encoder 200 and video decoder 300 may be configured to determine the class of a block of video data, and then determine the filter (e.g., the filter coefficients) to use for the block based on the determined class.

In VVC, a Laplacian-based classifier is used to derive class C. An N×N window that covers the target M×M block is used for classifying that target block. The activity and directionality are derived using values of a horizontal gradient, a vertical gradient, and two diagonal gradients calculated using a 1-D Laplacian, as follows:

$$H_{k,l} = |2R(k, l) - R(k - 1, l) - R(k + 1, l)|,$$

-continued $$V_{k,l} = |2R(k, l) - R(k, l - 1) - R(k, l + 1)|,$$

$$D1_{k,l} = |2R(k, l) - R(k - 1, l - 1) - R(k + 1, l + 1)|,$$

$$D2_{k,l} = |2R(k, l) - R(k - 1, l + 1) - R(k + 1, l - 1)|,$$

Where $H_{k,l}$ is the horizontal gradient, $V_{k,l}$ is the vertical gradient, $D1_{k,l}$ is a first diagonal gradient, and $D2_{k,l}$ is a second diagonal gradient. $R(x,y)$ is the reconstructed value at position $(x,y)$. The values of l and k are the positions of the pixels/samples in the block in the x and y axis, respectively.

The sums of the horizontal gradients, the vertical gradients, and the two diagonal gradients within the N×N window are denoted, respectively, as $g_h$, $g_v$, $g_{d1}$ and $g_{d2}$. The directionality D is determined by comparing the following with a set of thresholds.

$$r_{h,v} = \frac{\max(g_h, g_v)}{\min(g_h, g_v)}, r_{d1,d2} = \frac{\max(g_{d1}, g_{d2})}{\min(g_{d1}, g_{d2})},$$

where $r_{h,v}$ and $r_{d1,d2}$ are the two ratios of gradient sums. For example, directionality D could be determined as:

1: if $r_{h,v} \leq t_1$ and $r_{d1,d2} \leq t_1$, D is set to 0.

2: if $r_{h,v} > r_{d1,d2}$, D is calculated in step 3, otherwise, go to step 4.

3: if $r_{h,v} > t_2$, D is set to 2, otherwise D is set to 1.

4: if $r_{d1,d2} > t_2$, D is set to 4, otherwise D is set to 3.

The activity A is derived by calculating a sum of $g_h$ and $g_v$ and comparing the sum with the set of thresholds.

Before filtering, such as ALF, certain geometric transformations, such as rotation, diagonal and vertical flip, can be applied to the pixels in the filter support region (e.g., pixels which are multiplied by filtered coefficients) depending on the orientation of the gradient of the filtered pixel. These transformations increase similarity between different regions within the picture, e.g., their directionality. This can reduce the number of filters which are sent to the decoder, hence reducing the number of bits used to represent them. Such transformations may also reduce the reconstruction error. Applying the transformations to filter support region is equivalent to applying the transformations directly to the filter coefficients.

To reduce the number of bits used to represent the filter coefficients, different classes can be merged. The information indicating which classes are merged may be sent from the video encoder to the video decoder using an index $i_c$ for each of the 25 classes. Classes having the same index $i_c$ share the same filter.

The ALF coefficients of reference pictures may be stored in memory and may be reused as ALF coefficients of a current picture. For a current picture, video encoder 200 and video decoder 300 may determine to use ALF coefficients stored for the reference pictures, and bypass the signalling and reception of ALF coefficients. In this case, only an index to one of the reference pictures is signalled, and the stored ALF coefficients of the indicated reference picture are simply inherited (e.g., reused) for the current picture.

In one example proposed in Y.-J. Chang, C.-C. Chen, J. Chen, J. Dong, H. E. Egilmez, N. Hu, H. Huang, M. Karczewicz, J. Li, B. Ray, K. Reuze, V. Seregin, N. Shlyakhov, L. Pham Van, H. Wang, Y. Zhang, Z. Zhang, "Compression efficiency methods beyond VVC" document JVET-U0100, 21st JVET meeting, January 2021, video encoder

200 and video decoder 300 may be configured to use three different classifiers ($C_0$, $C_1$ and $C_2$) and three different sets of filters ($F_0$, $F_1$ and $F_2$). Filter sets $F_0$ and $F_1$ contain fixed filters, with coefficients trained for classifiers $C_0$ and $C_1$. Video encoder 200 may signal the coefficients of the filters in filter set $F_2$ to video decoder 300. Video encoder 200 and video decoder 300 may determine which filter from a filter set $F_i$ is used for a given sample based on a class $C_i$ assigned to this sample using classifier $C_i$. All three classifiers are Laplacian based and differ from the classifier used in VVC by using an N×N window having different values of N and using a different number of thresholds to determine activity and directionality.

This disclosure describes techniques for ALF that use new classifiers. The techniques of this disclosure may be used with ALF or any other type of filter where filter coefficients are determined based on a classifier. The new classifiers of this disclosure can be used for both fixed and signaled filters.

In a first example of the disclosure, video encoder 200 and video decoder 300 may be configured to use a first classifier that is based on a geometry partition, such as a geometry partition used in a Geometry Partitioning Mode (GPM). When video encoder 200 and video decoder 300 apply a geometry partition to an N×N block, the N×N block is split into partitions based on an angle and an offset distance. In accordance with one example of the disclosure, video encoder 200 and video decoder 300 may be configured to calculate the activity of each of the partitions using pixels/samples only belonging to that particular partition. The partition which is associated with the lowest sum of activities is used to determine the class of the entire N×N block.

Figure 2:
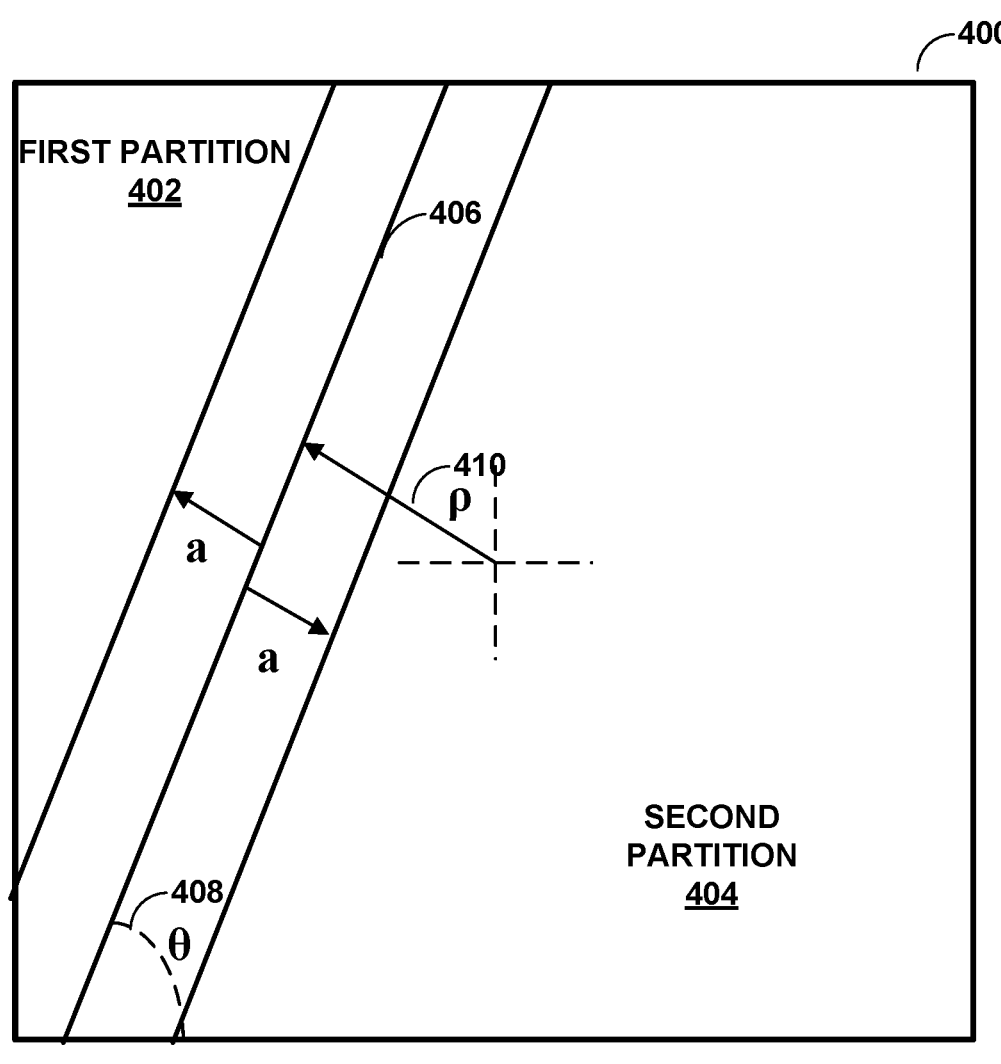
FIG. 2 is a conceptual diagram illustrating an example of geometry partitioning in accordance with the techniques of this disclosure.

For example, video encoder 200 and video decoder 300 may be configured to split a block into two partitions with a straight partitioning boundary, as follows:

$$f(x, y) = x \cos(\theta) - y \sin(\theta) + \rho,$$

with (x, y) defining continuous positions relating to the central position of the N×N block. FIG. 2 is a conceptual diagram illustrating an example of geometry partitioning in accordance with the techniques of this disclosure. As shown in FIG. 2, block 400 is partitioned in to a first partition 402 and a second partition 404 (e.g., sub-partitions). The boundary between partitions generated by the zero-level line 406, $f(x, y)=0$, is defined in terms of its angle $\theta$ 408 and offset distance p 410. The angle parameter $\theta$ 408 describes the anticlockwise angle from the x-axis to the normal vector of the partitioning boundary. The offset distance parameter $\rho$ 410 is the displacement of the partitioning boundary from the origin that is defined at the center of the block. Each pixel at location (x, y) is assigned to one of the partitions such that:

(1) if $f(x, y) > a$, the pixel belongs to Partition 0, or (2) if $f(x, y) < -a$, the pixel belongs to Partition 1.

In one example implementation, a=1. The value of alpha (a) is used to exclude some pixels/samples from both of the two partitions, as shown in FIG. 2. Alpha (a) defines a boundary distance between a partition boundary and line $f(x,y)=0$. If alpha (a) is 0, all pixels are included in either partition 0 or partition 1. Otherwise, some pixels are excluded from both partition 0 and partition 1.

Video encoder 200 and video decoder 300 may be configured to calculate the activity A of the N×N block in the same manner as described above. In addition to the activity A of the N×N block, video encoder 200 and video decoder

300 may be configured to calculate separate activities $A_0$ and $A_1$ for the partitions 0 (e.g., first partition 402) and partition 1 (e.g., second partition 404), respectively.

Video encoder 200 and video decoder 300 may calculate activities $A_0$ and $A_1$ for the partitions 0 and 1, respectively, for each candidate pair of values of angle $\theta$ and offset distance p as sums of horizontal and vertical gradients obtained using a 1D Laplacian. The activity values can be calculated using other methods such as a variance of the pixels belonging to the partition or the block. Video encoder 200 and video decoder 300 may then sum the values of activities $A_0$ and $A_1$ and store the sum in a memory.

Video encoder 200 and video decoder 300 may determine the class of the block based on the quantized values of the candidate pair of angle $\theta$ and distance p for which sum of activities $A_0$ and $A_1$ is the smallest. In one example, a candidate pair or pairs of angle $\theta$ and distance $\rho$ are mapped to a particular filter class. In addition, the filter class of the block can be defined by the activity A of the entire N×N block, as well as value the sum of the activities $A_0$ and $A_1$. In another example, video encoder 200 and video decoder 300 may be configured to determine the filter class based on the ratio $A/(A_0+A_1)$. In general, video encoder 200 and video decoder 300 may determine the filter class based on any combination of the of angle $\theta$ and distance $\rho$, the activity A of the entire N×N block, the value of the sum of the activities $A_0$ and $A_1$, and/or the ratio $A/(A_0+A_1)$.

Figure 3:
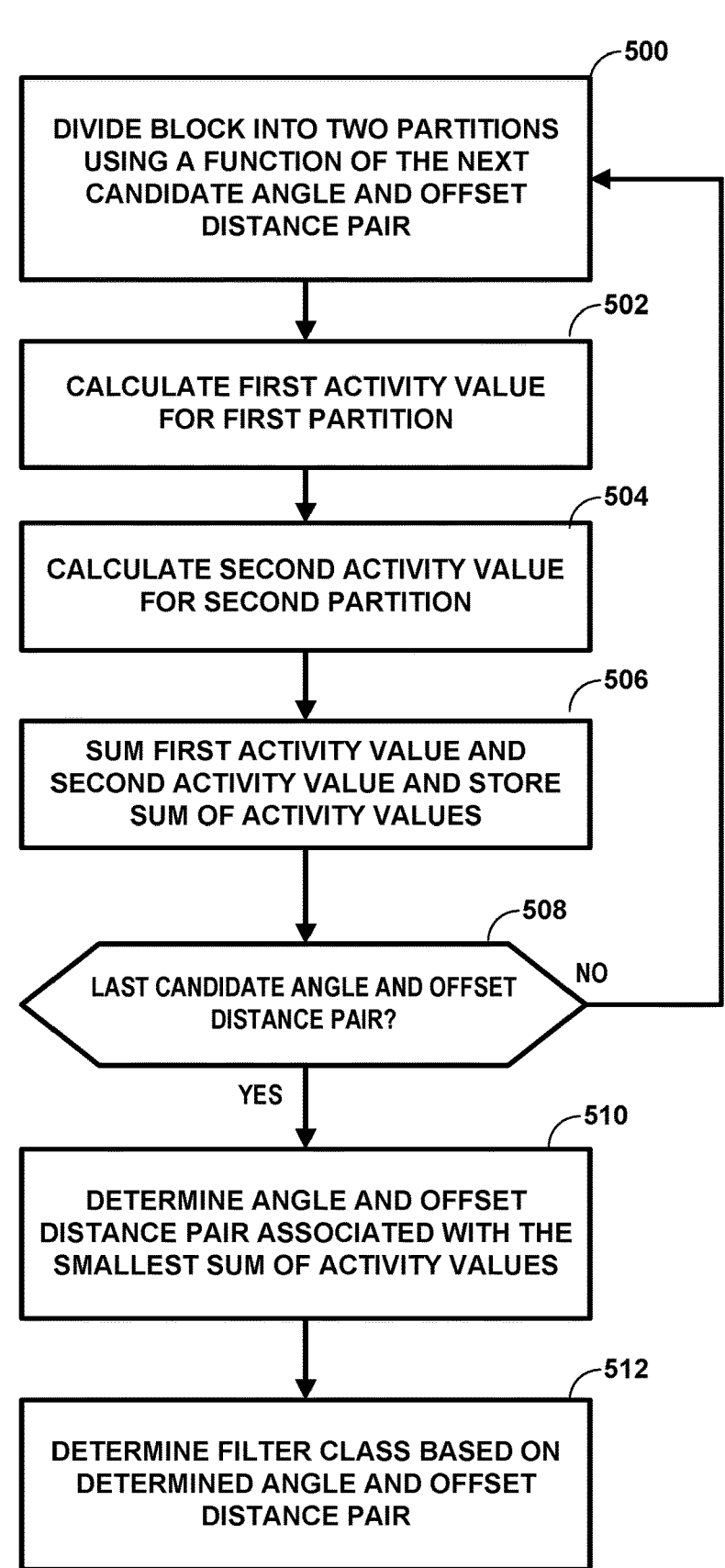
FIG. 3 is a flowchart illustrating one example of a geometry partition based filter classifier in accordance with the techniques of this disclosure.

FIG. 3 is a flowchart illustrating one example of a geometry partition based filter classifier in accordance with the techniques of this disclosure. Video encoder 200 and video decoder 300 may divide a block into two partitions using a function of the next candidate angle and offset distance pair of a plurality of angle and offset distance pairs (500). Video encoder 200 and video decoder 300 may calculate a first activity value ($A_0$) for a first partition (502) and may calculate a second activity value ($A_1$) for a second partition (504). Video encoder 200 and video decoder 300 may then sum the first activity value and the second activity value and store the sum of activity values in memory (506).

Video encoder 200 and video decoder 300 may then determine if the currently used candidate angle and offset distance pair is the last candidate angle and offset distance pair in the plurality of angles and offset distance pairs (508). If no at 508, video encoder 200 and video decoder 300 repeats processes 500-506 for all candidate angle and offset distance pairs.

If yes at 508, video encoder 200 and video decoder 300 determine the angle and offset distance pair that is associated with the smallest sum of activity values (510). Video encoder 200 and video decoder 300 then determine the filter class based on the determined angle and offset distance pair (512).

In summary, to determine the filter class using the first classifier based on the geometry partition, video encoder 200 and video decoder 300 are configured to determine respective sums of activity values for each partition structure of a plurality of partition structures, wherein each of the plurality of partition structures is defined by a respective angle and a respective offset distance, determine a partition structure of the plurality of partition structures associated a lowest sum of activity values of the respective sums of activity values of the sub-partitions (e.g., partition 0 or partition 1), and determine the filter class based on the respective angle and respective offset distance associated with a partition structure of the plurality of partition structures associated the lowest sum of activity values of the respective sums of activity values of the sub partitions. In one example, each of the plurality of partition structures is defined by the respective angle and the respective offset distance in a function $f(x, y)=x \cos(\theta)-y \sin(\theta)+\rho$ relative to a boundary distance alpha (a), wherein $f(x, y)$ is a partitioning boundary of a partition structure, $\theta$ is the respective angle, and $\rho$ is the respective offset distance.

Each pixel at location (x, y) is assigned to one of the partitions such that:

(1) if $f(x, y)>a$, the pixel belongs to Partition 0, or (2) if $f(x, y)<-a$, the pixel belongs to Partition 1.

In one example, to determine the respective sums of activity values for each partition structure of a plurality of partition structures, video encoder 200 and video decoder 300 are configured to determine respective first activity values for respective first partitions of the plurality of partition structures using samples of the block of video data in the respective first partitions, determine respective second activity values for respective second partitions of the plurality of partition structures using samples of the block of video data in the respective second partitions, and add the respective first activity values to the respective second activity values to determine the respective sums of activity values.

In one example, to determine respective sums of activity values, video encoder 200 and video decoder 300 are configured to determine respective sums of activity values based on a horizontal gradient and a vertical gradient obtained using a 1D Laplacian. In another example, to determine respective sums of activity values, video encoder 200 and video decoder 300 are configured to determine respective sums of activity values based on a variance of samples.

In another example, to determine the filter class based on the respective angle and respective offset distance associated with a partition structure of the plurality of partition structures associated the lowest sum of activity values of the respective sums of activity values, video encoder 200 and video decoder 300 are configured to determine the filter class based on the respective angle and respective offset distance and an overall activity calculated for the block.

In another example, to determine the filter class based on the respective angle and respective offset distance associated with a partition structure of the plurality of partition structures associated the lowest sum of activity values of the respective sums of activity values, video encoder 200 and video decoder 300 are configured to determine the filter class based on the respective angle and respective offset distance and an overall activity calculated for the two sub-partitions.

In another example, to determine the filter class based on the respective angle and respective offset distance associated with a partition structure of the plurality of partition structures associated the lowest sum of activity values of the respective sums of activity values, video encoder 200 and video decoder 300 are configured to determine the filter class based on the respective angle and respective offset distance and ratio of an overall activity calculated for the block and the lowest sum of activity values in the two sub-partitions.

In a second example of the disclosure, video encoder 200 and video decoder 300 may be configured to use a second classifier based on a Histogram of Gradients. Video encoder 200 and video decoder 300 calculate a gradient for each pixel/sample in N× N block used for classification. In this context, sample may refer to either a chroma sample or a luma sample, and pixel may generally refer to either. Video encoder 200 and video decoder 300 may perform the gradient calculation using Sobel filters, denoted as $M_x$ and $M_y$. The convolution between these two filters and a 3×3 window (denoted as W) centered around each pixel in N×N block used for classification is performed to derive horizontal and vertical gradients, denoted as $G_x$ and $G_y$, respectively. The following is an example of such filters and the derivation of horizontal and vertical gradients:

$$G_x = M_x * W, G_y = M_y * W, \text{ where}$$

$$M_x = \begin{bmatrix} 1 & 0 & -1 \\ 2 & 0 & -2 \\ 1 & 0 & -1 \end{bmatrix}, M_y = \begin{bmatrix} 1 & 2 & 1 \\ 0 & 0 & 0 \\ -1 & -2 & -1 \end{bmatrix},$$

and wherein * denotes convolution operation. Using this information, video encoder 200 and video decoder 300 may calculate a gradient direction for a sample as follows:

$$\theta = \text{atan2}(G_y/G_x).$$

Video encoder 200 and video decoder 300 may calculate a gradient amplitude G for a sample as follows:

$$G = |G_x| + |G_y|.$$

Video encoder 200 and video decoder 300 may further quantize the value of the angle $\theta$ into an index (idx). Video encoder 200 and video decoder 300 may store each unique index into a Histogram of Gradients (HoG) table. Video encoder 200 and video decoder 300 may further store a sum of all gradient magnitudes for each sample having the sample index value. That is, video encoder 200 and video decoder 300 may sum all gradient magnitude value derived for each sample that has the same index value and store that summed gradient magnitude value in the HoG table. Once the entire block has been processed, the HoG table will include every unique index value as well as the sums of gradient magnitudes for each pixel having the unique index value.

In one example implementation, video encoder 200 and video decoder 300 may determine the filter class of the by index (idx) in the HoG table that has the highest sum of gradient amplitudes. Video encoder 200 and video decoder 300 may use the value of this highest sum of gradient amplitudes, as well as the average gradient magnitude per pixel/sample for which gradients were calculated to determine the filter class. In another example, video encoder 200 and video decoder 300 may use a first n quantized angles (e.g., first n indexes) with the highest amplitudes to determine the filter class.

Figure 4:
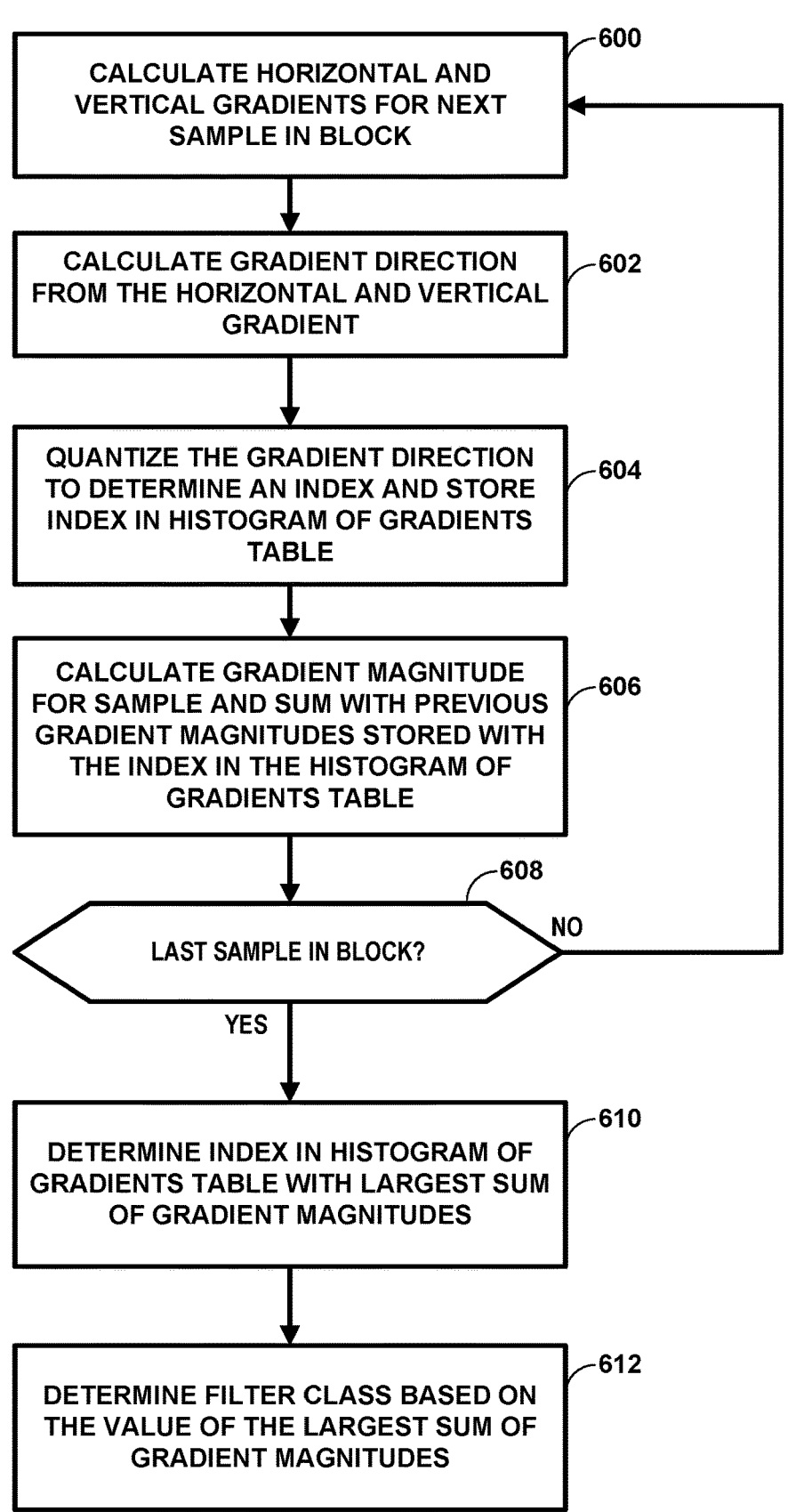
FIG. 4 is a flowchart illustrating one example of a histogram of gradients based filter classifier in accordance with the techniques of this disclosure.

FIG. 4 is a flowchart illustrating one example of a histogram of gradients based filter classifier in accordance with the techniques of this disclosure. Video encoder 200 and video decoder 300 may calculate horizontal and vertical gradients for the next sample in a block (600). Video encoder 200 and video decoder 300 may then calculate a gradient direction from the horizontal and vertical gradients (602) and quantize the gradient direction to determine an index (604). Video encoder 200 and video decoder 300 may store the index in a histogram of gradients table (604).

Video encoder 200 and video decoder 300 may then calculate a gradient magnitude for the sample and sum the calculated gradient magnitude with any previous gradient magnitudes stored with the associated index in the histogram of gradients table (606). Video encoder 200 and video decoder 300 may the determine if the currently processed sample is the last sample in the block (608). If no at 608, video encoder 200 and video decoder 300 continues to process each sample of the block using processes 600-606.

If yes at 608, video encoder 200 and video decoder 300 determine the index in the histogram of gradients table with the largest sum of gradient magnitudes (610). Video encoder 200 and video decoder 300 then determines a filter class for the block based at least in part on the value of the largest sum of gradient magnitudes (612).

In summary, to determine the filter class using the second classifier based on the histogram of gradients, video encoder 200 and video decoder 300 are configured to calculate a respective vertical gradient and a respective horizontal gradient for each sample in the reconstructed block, determine a respective gradient direction for each sample in the reconstructed block using the respective vertical gradient and the respective horizontal gradient, determine a respective gradient amplitude for each sample in the reconstructed block using the vertical gradient and the horizontal gradient, and determine the filter class for the reconstructed block based on the respective gradient directions and the respective gradient amplitudes.

Video encoder 200 and video decoder 300 may be further configured to quantize the respective gradient direction for each sample into respective indexes, and store, in a histogram of gradients table, a sum of respective gradient magnitudes corresponding to each sample assigned a particular value of the respective index.

In one example, to determine the filter class for the reconstructed block based on the respective gradient directions and the respective gradient amplitudes, video encoder 200 and video decoder 300 are configured to determine an index of the respective indexes in the histogram of gradients table that is associated with the largest sum of respective gradient magnitudes, and determine the filter class based on a value of the largest sum of respective gradient magnitudes and an average gradient magnitude per sample in the block.

In another example, to calculate the respective vertical gradient and the respective horizontal gradient for each sample in the reconstructed block, video encoder 200 and video decoder 300 are configured to calculate the respective vertical gradient and the respective horizontal gradient for each sample in the reconstructed block using horizontal and vertical Sobel filters.

Figure 5:
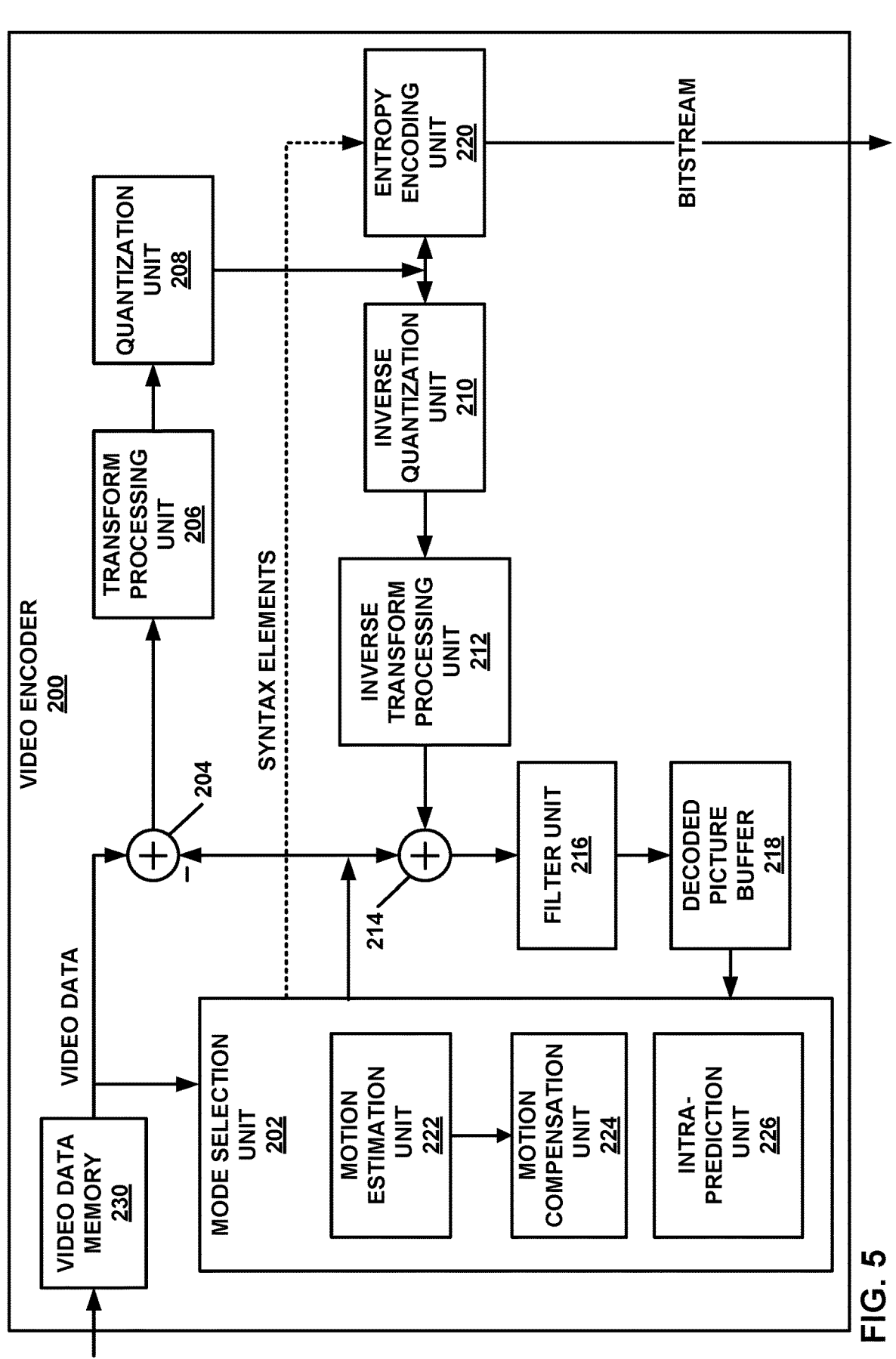
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Filter unit 216 may be configured to perform one or more of the techniques of this disclosure for determining a filter class, as is described above. For example, after video encoder 200 reconstructs a block of video data to generate a reconstructed block, filter unit 216 may be configured to determine a filter class for the reconstructed block using a classifier from a plurality of classifiers. As described above, the plurality of classifiers may include one or more of a first classifier based on a geometry partition and a second classifier based on a histogram of gradients. Filter unit 216 may determine a filter (e.g., an ALF) based on the filter class, and apply the filter to the reconstructed block.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to reconstruct a block of video data to generate a reconstructed block, determine a filter class for the reconstructed block using a classifier from a plurality of classifiers, wherein the plurality of classifiers includes one or more of a first classifier based on a geometry partition and a second classifier based on a histogram of gradients, determine a filter based on the filter class, and apply the filter to the reconstructed block.

Figure 6:
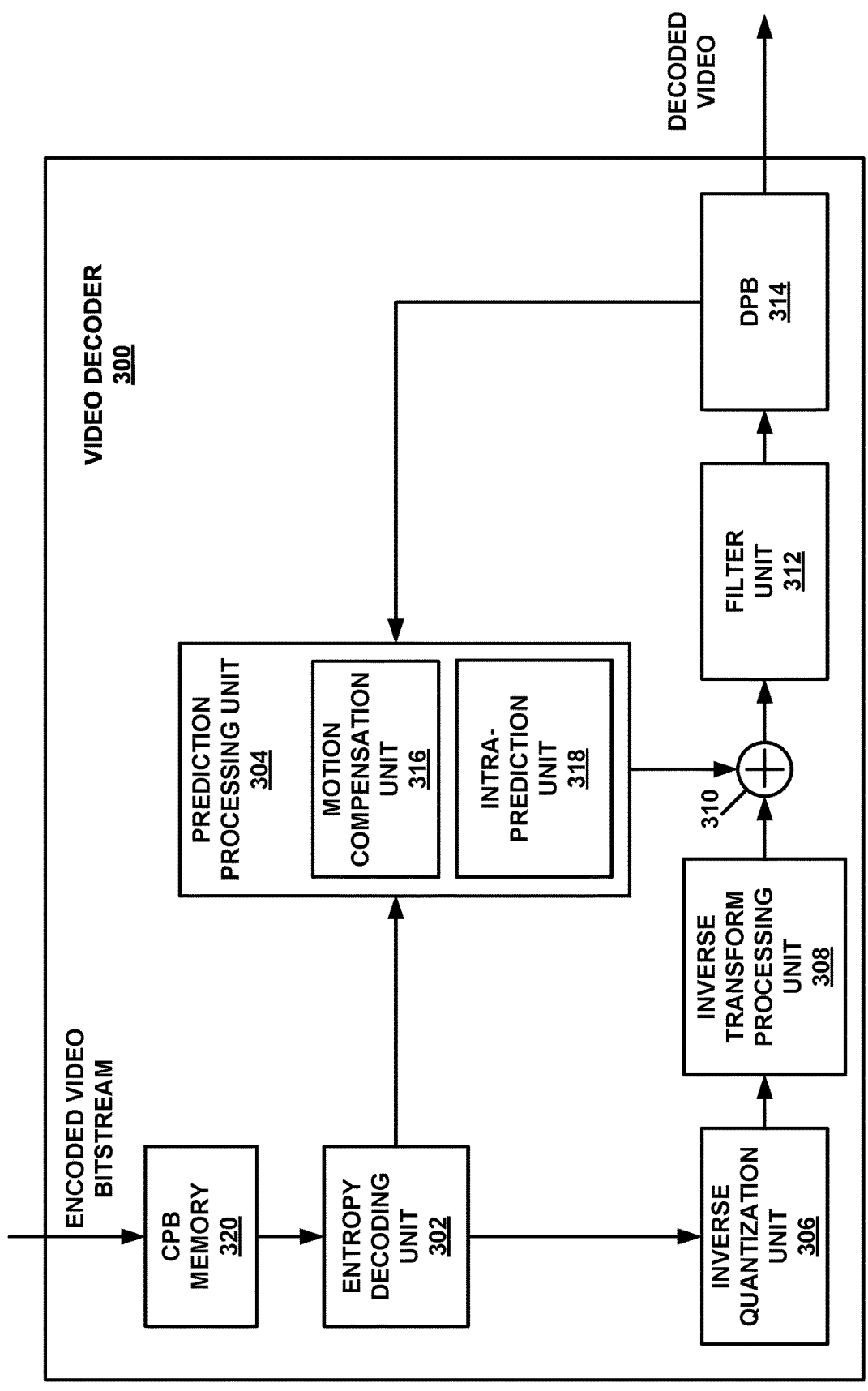
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Filter unit 312 may be configured to perform one or more of the techniques of this disclosure for determining a filter class, as is described above. For example, after video decoder 300 reconstructs (e.g., decodes) a block of video data to generate a reconstructed block, filter unit 312 may be configured to determine a filter class for the reconstructed block using a classifier from a plurality of classifiers. As described above, the plurality of classifiers may include one or more of a first classifier based on a geometry partition and a second classifier based on a histogram of gradients. Filter unit 312 may determine a filter (e.g., an ALF) based on the filter class, and apply the filter to the reconstructed block.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to reconstruct a block of video data to generate a reconstructed block, determine a filter class for the reconstructed block using a classifier from a plurality of classifiers, wherein the plurality of classifiers includes one or more of a first classifier based on a geometry partition and a second classifier based on a histogram of gradients, determine a filter based on the filter class, and apply the filter to the reconstructed block.

Figure 7:
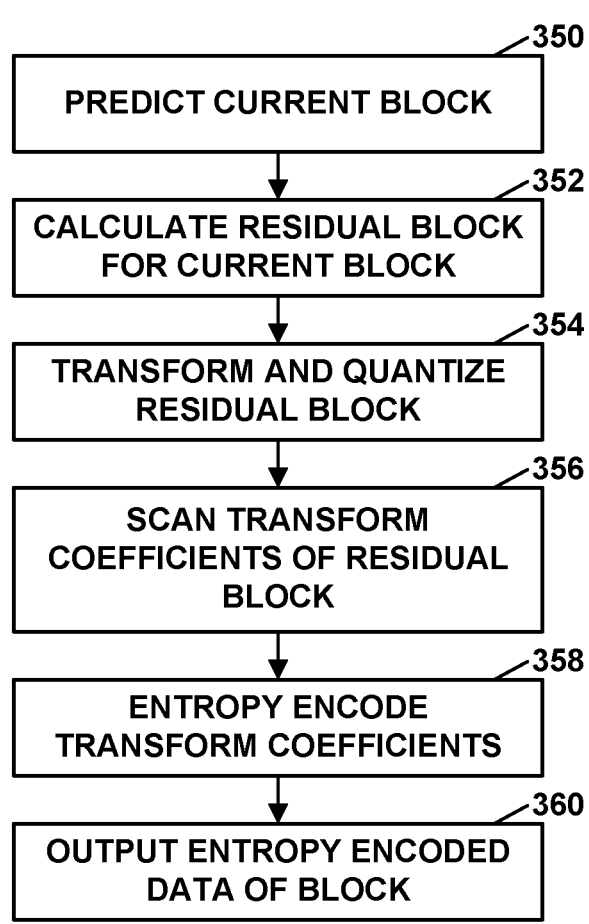
FIG. 7 is a flowchart illustrating an example method for encoding a current block in accordance with the techniques of this disclosure.

FIG. 7 is a flowchart illustrating an example method for encoding a current block in accordance with the techniques of this disclosure. The current block may be or include a current CU. Although described with respect to video encoder 200 (FIGS. 1 and 5), it should be understood that other devices may be configured to perform a method similar to that of FIG. 7.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

After encoding the block, video encoder 200 may reconstruct the block and then filter the reconstructed block in accordance with the techniques of this disclosure. For example, video encoder 200 may determine a filter class using a classifier from a plurality of classifiers, wherein the plurality of classifiers includes one or more of a first classifier based on a geometry partition and a second classifier based on a histogram of gradients.

Figure 8:
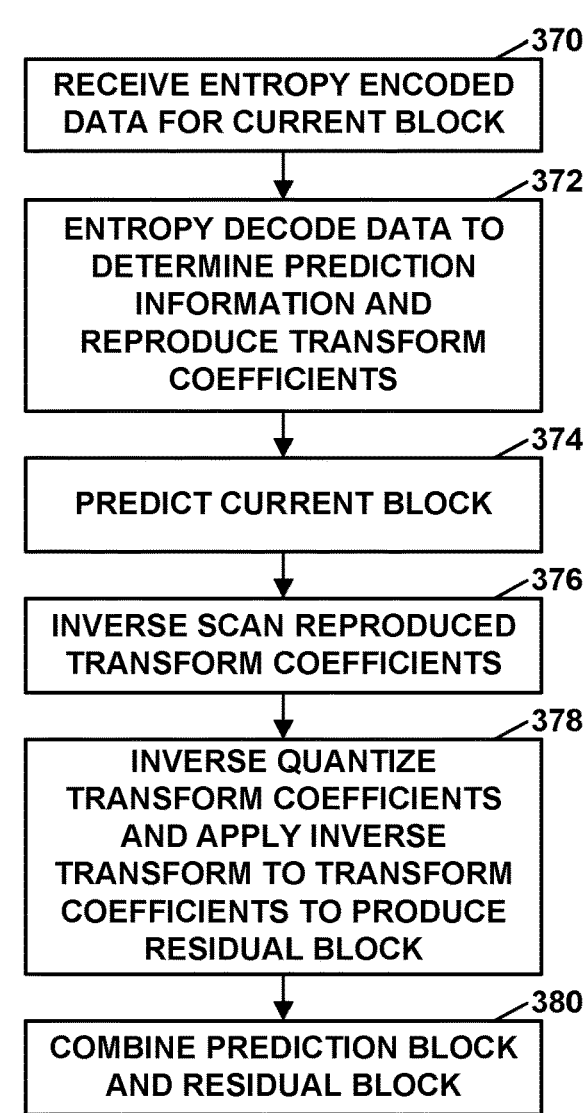
FIG. 8 is a flowchart illustrating an example method for decoding a current block in accordance with the techniques of this disclosure.

FIG. 8 is a flowchart illustrating an example method for decoding a current block of video data in accordance with the techniques of this disclosure. The current block may be or include a current CU. Although described with respect to video decoder 300 (FIGS. 1 and 6), it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380). After decoding the block, video decoder 300 may filter the decoded/reconstructed block in accordance with the techniques of this disclosure, including determining a filter class using a classifier from a plurality of classifiers, wherein the plurality of classifiers includes one or more of a first classifier based on a geometry partition and a second classifier based on a histogram of gradients.

FIG. 9 is a flowchart illustrating an example method for encoding or decoding a block of video data in accordance with the techniques of this disclosure. The techniques of FIG. 9 may be performed by video encoder 200 and video decoder 300, including filter unit 216 (FIG. 5) and filter unit 312 (FIG. 6), respectively.

In one example of the disclosure, video encoder 200 and video decoder 300 may be configured to reconstruct a block of video data to generate a reconstructed block (900). In the example where the techniques of FIG. 9 are performed by video encoder 200, video encoder 200 may be configured to reconstruct the block of video data in a reconstruction loop of a video encoding process to generate the reconstructed block. In the example where the techniques of FIG. 9 are performed by video decoder 300, video decoder 300 may be configured to decode the block of video data to generate the reconstructed block.

Video encoder 200 and video decoder 300 may determine a filter class for the reconstructed block using a classifier from a plurality of classifiers, wherein the plurality of classifiers includes one or more of a first classifier based on a geometry partition and a second classifier based on a histogram of gradients (910). Video encoder 200 and video decoder 300 may then determine a filter based on the filter class (920) and apply the filter to the reconstructed block (930). The filter may be an adaptive loop filter.

In a first example, the classifier is the first classifier based on the geometry partition. In this example, to determine the filter class using the first classifier based on the geometry partition, video encoder 200 and video decoder 300 may be configured to determine respective sums of activity values for each partition structure of a plurality of partition structures, wherein each of the plurality of partition structures is defined by a respective angle and a respective offset distance, determine a partition structure of the plurality of partition structures associated a lowest sum of activity values of the respective sums of activity values, and determine the filter class based on the respective angle and respective offset distance associated with a partition structure of the plurality of partition structures associated the lowest sum of activity values of the respective sums of activity values.

In another example where the first classifier is based on the geometry partition, to determine the respective sums of activity values for each partition structure of a plurality of partition structures video encoder 200 and video decoder 300 may be configured to determine respective first activity values for respective first partitions of the plurality of partition structures using samples of the block of video data in the respective first partitions, determine respective second activity values for respective second partitions of the plurality of partition structures using samples of the block of video data in the respective second partitions, and add the respective first activity values to the respective second activity values to determine the respective sums of activity values.

In the example where the first classifier is based on the geometry partition, each of the plurality of partition structures is defined by the respective angle and the respective offset distance in a function $f(x, y) = x \cos(\theta) - y \sin(\theta) + \rho$ relative to a boundary distance alpha (a), wherein $f(x, y)$ is a partitioning boundary of a partition structure, $\theta$ is the respective angle, and $\rho$ is the respective offset distance.

In another example where the first classifier is based on the geometry partition to determine respective sums of activity values, video encoder 200 and video decoder 300 may be configured to determine respective sums of activity values based on a horizontal gradient and a vertical gradient obtained using a 1D Laplacian.

In another example where the first classifier is based on the geometry partition, to determine respective sums of activity values, video encoder 200 and video decoder 300 may be configured to determine respective sums of activity values based on a variance of samples.

In another example where the first classifier is based on the geometry partition, to determine the filter class based on the respective angle and respective offset distance associated with the partition structure of the plurality of partition structures associated the lowest sum of activity values of the respective sums of activity values, video encoder 200 and video decoder 300 may be configured to determine the filter class based on the respective angle and respective offset distance and an overall activity calculated for the block.

In another example where the first classifier is based on the geometry partition, to determine the filter class based on the respective angle and respective offset distance associated with the partition structure of the plurality of partition structures associated the lowest sum of activity values of the respective sums of activity values, video encoder 200 and video decoder 300 may be configured to determine the filter class based on the respective angle and respective offset distance and ratio of an overall activity calculated for the block and the lowest sum of activity values of the plurality of partition structures.

In a second example, the classifier is the second classifier based on the histogram of gradients. In this example, to determine the filter class using the second classifier based on the histogram of gradients, video encoder 200 and video decoder 300 may be configured to calculate a respective vertical gradient and a respective horizontal gradient for each sample in the reconstructed block, determine a respective gradient direction for each sample in the reconstructed block using the respective vertical gradient and the respective horizontal gradient. determine a respective gradient amplitude for each sample in the reconstructed block using the vertical gradient and the horizontal gradient, and determine the filter class for the reconstructed block based on the respective gradient directions and the respective gradient amplitudes.

In another example where the second classifier is based on the histogram of gradients, video encoder 200 and video decoder 300 may be configured to quantize the respective gradient direction for each sample into respective indexes, and store, in a histogram of gradients table, a sum of respective gradient magnitudes corresponding to each sample assigned a particular value of the respective index.

In another example where the second classifier is based on the histogram of gradients, to determine the filter class for the reconstructed block based on the respective gradient directions and the respective gradient amplitudes, video encoder 200 and video decoder 300 may be configured to determine an index of the respective indexes in the histogram of gradients table that is associated with the largest sum of respective gradient magnitudes, and determine the filter class based on a value of the largest sum of respective gradient magnitudes and an average gradient magnitude per sample in the block.

In another example where the second classifier is based on the histogram of gradients, to calculate the respective vertical gradient and the respective horizontal gradient for each sample in the reconstructed block, video encoder 200 and video decoder 300 may be configured to calculate the respective vertical gradient and the respective horizontal gradient for each sample in the reconstructed block using horizontal and vertical Sobel filters.

The following numbered clauses illustrate one or more aspects of the devices and techniques described in this disclosure.

Aspect 1A—A method of coding video data, the method comprising: reconstructing a block of video data to generate a reconstructed block; determining an adaptive loop filter (ALF) class for the reconstructed block using one of a plurality of classifiers, wherein the plurality of classifiers includes a first classifier based on a geometry partition mode, and a second classifier based on a histogram of gradients (HoG); determining an ALF based on the ALF class; and applying the ALF to the reconstructed block.

Aspect 2A—The method of Aspect 1A, wherein determining the ALF class using the first classifier based on the geometry partition mode comprises: dividing the reconstructed block into a first partition and a second partition using the geometry partition mode based on an angel and an offset distance; determining a first sum of activities for the first partition; determining a second sum of activities for the second partition; and determining the ALF class for the reconstructed block using either the first partition or the second partition based on which of the first sum of activities or the second sum of activities is the smallest.

Aspect 3A—The method of Aspect 2A, wherein determining the first sum of activities for the first partition comprises: determining the first sum of activities for the first partition as a sum of a horizontal gradient and a vertical gradient obtained using a 1D Laplacian.

Aspect 4A—The method of Aspect 2A, wherein determining the second sum of activities for the second partition comprises: determining the second sum of activities for the second partition as a sum of a horizontal gradient and a vertical gradient obtained using a 1D Laplacian.

Aspect 5A—The method of Aspect 1A, wherein determining the ALF class using the first classifier based on the geometry partition mode comprises: dividing the reconstructed block into a first partition and a second partition using the geometry partition mode based on an angel and an offset distance; determining an activity of the reconstructed block; determining a first sum of activities for the first partition; determining a second sum of activities for the second partition; and determining the ALF class for the reconstructed block based on the activity, the first sum of activities, and the second sum of activities.

Aspect 6A—The method of Aspect 1A, wherein determining the ALF class using the second classifier based on the HoG comprises: calculating a vertical gradient and a horizontal gradient for each pixel in the reconstructed block; determining a gradient direction for each pixel in the reconstructed block using the vertical gradient and the horizontal gradient; determining a gradient amplitude for each pixel in the reconstructed block using the vertical gradient and the horizontal gradient; and determining the ALF class for the reconstructed block based on at least one gradient direction and associated gradient amplitude.

Aspect 7A—The method of any of Aspects 1A-6A, wherein coding comprises decoding.

Aspect 8A—The method of any of Aspects 1A-6A, wherein coding comprises encoding.

Aspect 9A—A device for coding video data, the device comprising one or more means for performing the method of any of Aspects 1A-8A.

Aspect 10A—The device of Aspect 9A, wherein the one or more means comprise one or more processors implemented in circuitry.

Aspect 11A—The device of any of Aspects 9A and 10A, further comprising a memory to store the video data.

Aspect 12A—The device of any of Aspects 9A-11A, further comprising a display configured to display decoded video data.

Aspect 13A—The device of any of Aspects 9A-12A, wherein the device comprises one or more of a camera, a computer, a mobile device, a broadcast receiver device, or a set-top box.

Aspect 14A—The device of any of Aspects 9A-13A, wherein the device comprises a video decoder.

Aspect 15A—The device of any of Aspects 9A-14A, wherein the device comprises a video encoder.

Aspect 16A—A computer-readable storage medium having stored thereon instructions that, when executed, cause one or more processors to perform the method of any of Aspects 1A-8A.

Aspect 17A—A device for coding video data, the device comprising: means for reconstructing a block of video data to generate a reconstructed block; means for determining an adaptive loop filter (ALF) class for the reconstructed block using one of a plurality of classifiers, wherein the plurality of classifiers includes a first classifier based on a geometry partition mode, and a second classifier based on a histogram of gradients (HoG); means for determining an ALF based on the ALF class; and means for applying the ALF to the reconstructed block.

Aspect 1B—A method of coding video data, the method comprising: reconstructing a block of video data to generate a reconstructed block; determining a filter class for the reconstructed block using a classifier from a plurality of classifiers, wherein the plurality of classifiers includes one or more of a first classifier based on a geometry partition and a second classifier based on a histogram of gradients; determining a filter based on the filter class; and applying the filter to the reconstructed block.

Aspect 2B=The method of Aspect 1B, wherein the classifier is the first classifier based on the geometry partition.

Aspect 3B—The method of Aspect 2B, wherein determining the filter class using the first classifier based on the geometry partition comprises: determining respective sums of activity values for each partition structure of a plurality of partition structures, wherein each of the plurality of partition structures is defined by a respective angle and a respective offset distance; determining a partition structure of the plurality of partition structures associated a lowest sum of activity values of the respective sums of activity values; and determining the filter class based on the respective angle and respective offset distance associated with a partition structure of the plurality of partition structures associated the lowest sum of activity values of the respective sums of activity values.

Aspect 4B—The method of Aspect 3B, wherein determining the respective sums of activity values for each partition structure of a plurality of partition structures comprises: determining respective first activity values for respective first partitions of the plurality of partition structures using samples of the block of video data in the respective first partitions; determining respective second activity values for respective second partitions of the plurality of partition structures using samples of the block of video data in the respective second partitions; and adding the respective first activity values to the respective second activity values to determine the respective sums of activity values.

Aspect 5B—The method of any of Aspects 3B-4B, wherein each of the plurality of partition structures is defined by the respective angle and the respective offset distance in a function $f(x, y)=x \cos(\theta)-y \sin(\theta)+\rho$ relative to a boundary distance alpha (a), wherein $f(x, y)$ is a partitioning boundary of a partition structure, $\theta$ is the respective angle, and $\rho$ is the respective offset distance.

Aspect 6B—The method of Aspect 3B, wherein determining respective sums of activity values comprises: determining respective sums of activity values based on a horizontal gradient and a vertical gradient obtained using a 1D Laplacian.

Aspect 7B—The method of Aspect 3B, wherein determining respective sums of activity values comprises: determining respective sums of activity values based on a variance of samples.

Aspect 8B—The method of any of Aspects 3B-7B, wherein determining the filter class based on the respective angle and respective offset distance associated with the partition structure of the plurality of partition structures associated the lowest sum of activity values of the respective sums of activity values comprises: determining the filter class based on the respective angle and respective offset distance and an overall activity calculated for the block.

Aspect 9B—The method of any of Aspects 3B-7B, wherein determining the filter class based on the respective angle and respective offset distance associated with the partition structure of the plurality of partition structures associated the lowest sum of activity values of the respective sums of activity values comprises: determining the filter class based on the respective angle and respective offset distance and ratio of an overall activity calculated for the block and the lowest sum of activity values of the plurality of partition structures.

Aspect 10B—The method of Aspect 1B, wherein the classifier is the second classifier based on the histogram of gradients.

Aspect 11B—The method of Aspect 10B, wherein determining the filter class using the second classifier based on the histogram of gradients comprises: calculating a respective vertical gradient and a respective horizontal gradient for each sample in the reconstructed block; determining a respective gradient direction for each sample in the reconstructed block using the respective vertical gradient and the respective horizontal gradient; determining a respective gradient amplitude for each sample in the reconstructed block using the vertical gradient and the horizontal gradient; and determining the filter class for the reconstructed block based on the respective gradient directions and the respective gradient amplitudes.

Aspect 12B—The method of Aspect 11B, further comprising: quantizing the respective gradient direction for each sample into respective indexes; and storing, in a histogram of gradients table, a sum of respective gradient magnitudes corresponding to each sample assigned a particular value of the respective index.

Aspect 13B—The method of Aspect 12B, wherein determining the filter class for the reconstructed block based on the respective gradient directions and the respective gradient amplitudes comprises: determining an index of the respective indexes in the histogram of gradients table that is associated with the largest sum of respective gradient magnitudes; and determining the filter class based on a value of the largest sum of respective gradient magnitudes and an average gradient magnitude per sample in the block.

Aspect 14B—The method of any of Aspects 11B-13B, wherein calculating the respective vertical gradient and the respective horizontal gradient for each sample in the reconstructed block comprises: calculating the respective vertical gradient and the respective horizontal gradient for each sample in the reconstructed block using horizontal and vertical Sobel filters.

Aspect 15B—The method of any of Aspects 1B-14B, wherein the filter is an adaptive loop filter.

Aspect 16B—The method of any of Aspects 1B-15B, wherein coding comprises encoding, and wherein reconstructing the block of video data to generate the reconstructed block comprises: reconstructing the block of video data in a reconstruction loop of a video encoding process to generate the reconstructed block.

Aspect 17B—The method of any of Aspects 1B-15B, wherein coding comprises decoding, and wherein reconstructing the block of video data to generate the reconstructed block comprises: decoding the block of video data to generate the reconstructed block.

Aspect 18B—An apparatus configured to code video data, the apparatus comprising: a memory configured to store a block of video data; and one or more processors in communication with the memory, the one or more processors configured to: reconstruct the block of video data to generate a reconstructed block; determine a filter class for the reconstructed block using a classifier from a plurality of classifiers, wherein the plurality of classifiers includes one or more of a first classifier based on a geometry partition and a second classifier based on a histogram of gradients; determine a filter based on the filter class; and apply the filter to the reconstructed block.

Aspect 19B—The apparatus of Aspect 18B, wherein the classifier is the first classifier based on the geometry partition.

Aspect 20B—The apparatus of Aspect 19B, wherein to determine the filter class using the first classifier based on the geometry partition, the one or more processors are further configured to: determine respective sums of activity values for each partition structure of a plurality of partition structures, wherein each of the plurality of partition structures is defined by a respective angle and a respective offset distance; determine a partition structure of the plurality of partition structures associated a lowest sum of activity values of the respective sums of activity values; and determine the filter class based on the respective angle and respective offset distance associated with a partition structure of the plurality of partition structures associated the lowest sum of activity values of the respective sums of activity values.

Aspect 21B—The apparatus of Aspect 20B, wherein to determine the respective sums of activity values for each partition structure of a plurality of partition structures, the one or more processors are further configured to: determine respective first activity values for respective first partitions of the plurality of partition structures using samples of the block of video data in the respective first partitions; determine respective second activity values for respective second partitions of the plurality of partition structures using samples of the block of video data in the respective second partitions; and add the respective first activity values to the respective second activity values to determine the respective sums of activity values.

Aspect 22B—The apparatus of any of Aspects 20B-21B, wherein each of the plurality of partition structures is defined by the respective angle and the respective offset distance in a function $f(x, y)=x \cos(\theta)-y \sin(\theta)+\rho$ relative to a boundary distance alpha (a), wherein $f(x, y)$ is a partitioning boundary of a partition structure, $\theta$ is the respective angle, and $\rho$ is the respective offset distance.

Aspect 23B—The apparatus of Aspect 20B, wherein to determine respective sums of activity values, the one or more processors are further configured to: determine respective sums of activity values based on a horizontal gradient and a vertical gradient obtained using a 1D Laplacian.

Aspect 24B—The apparatus of Aspect 20B, wherein to determine respective sums of activity values, the one or more processors are further configured to: determine respective sums of activity values based on a variance of samples.

Aspect 25B—The apparatus of any of Aspects 20B-24B, wherein to determine the filter class based on the respective angle and respective offset distance associated with the partition structure of the plurality of partition structures associated the lowest sum of activity values of the respective sums of activity values, the one or more processors are further configured to: determine the filter class based on the respective angle and respective offset distance and an overall activity calculated for the block.

Aspect 26B—The apparatus of any of Aspects 20B-24B, wherein to determine the filter class based on the respective angle and respective offset distance associated with the partition structure of the plurality of partition structures associated the lowest sum of activity values of the respective sums of activity values, the one or more processors are further configured to: determine the filter class based on the respective angle and respective offset distance and ratio of an overall activity calculated for the block and the lowest sum of activity values of the plurality of partition structures.

Aspect 27B—The apparatus of Aspect 18B, wherein the classifier is the second classifier based on the histogram of gradients.

Aspect 28B—The apparatus of Aspect 27B, wherein to determine the filter class using the second classifier based on the histogram of gradients, the one or more processors are further configured to: calculate a respective vertical gradient and a respective horizontal gradient for each sample in the reconstructed block; determine a respective gradient direction for each sample in the reconstructed block using the respective vertical gradient and the respective horizontal gradient; determine a respective gradient amplitude for each sample in the reconstructed block using the vertical gradient and the horizontal gradient; and determine the filter class for the reconstructed block based on the respective gradient directions and the respective gradient amplitudes.

Aspect 29B—The apparatus of Aspect 28B, wherein the one or more processors are further configured to: quantize the respective gradient direction for each sample into respective indexes; and store, in a histogram of gradients table, a sum of respective gradient magnitudes corresponding to each sample assigned a particular value of the respective index.

Aspect 30B—The apparatus of Aspect 29B, wherein to determine the filter class for the reconstructed block based on the respective gradient directions and the respective gradient amplitudes, the one or more processors are further configured to: determine an index of the respective indexes in the histogram of gradients table that is associated with the largest sum of respective gradient magnitudes; and determine the filter class based on a value of the largest sum of respective gradient magnitudes and an average gradient magnitude per sample in the block.

Aspect 31B—The apparatus of any of Aspects 28B-20B, wherein to calculate the respective vertical gradient and the respective horizontal gradient for each sample in the reconstructed block, the one or more processors are further configured to: calculate the respective vertical gradient and the respective horizontal gradient for each sample in the reconstructed block using horizontal and vertical Sobel filters.

Aspect 32B—The apparatus of any of Aspects 18B-31B, wherein the filter is an adaptive loop filter.

Aspect 33B—The apparatus of any of Aspects 18B-32B, wherein to code the video data, the apparatus is configured to encode the video data, and wherein to reconstruct the block of video data to generate the reconstructed block, the one or more processors are further configured to: reconstruct the block of video data in a reconstruction loop of a video encoding process to generate the reconstructed block.

Aspect 34B—The apparatus of Aspect 33B, further comprising: a camera configured to capture a picture that includes the block of video data.

Aspect 35B—The apparatus of any of Aspects 18B-32B, wherein to code the video data, the apparatus is configured to decode the video data, and wherein to reconstruct the block of video data to generate the reconstructed block, the one or more processors are further configured to: decode the block of video data to generate the reconstructed block.

Aspect 36B—The apparatus of Aspect 35B, further comprising: a display configured to display a picture that includes the reconstructed block.

Aspect 37B—An apparatus configured to code video data, the apparatus comprising: means for reconstructing a block of video data to generate a reconstructed block; means for determining a filter class for the reconstructed block using a classifier from a plurality of classifiers, wherein the plurality of classifiers includes one or more of a first classifier based on a geometry partition and a second classifier based on a histogram of gradients; means for determining a filter based on the filter class; and means for applying the filter to the reconstructed block.

Aspect 38B—A non-transitory computer-readable storage medium storing instructions that, when executed, cause one or more processors of a device configured to code video data to: reconstruct a block of video data to generate a reconstructed block; determine a filter class for the reconstructed block using a classifier from a plurality of classifiers, wherein the plurality of classifiers includes one or more of a first classifier based on a geometry partition and a second classifier based on a histogram of gradients; determine a filter based on the filter class; and apply the filter to the reconstructed block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
reconstructing a block of video data to generate a reconstructed block;
determining a filter class for the reconstructed block using a classifier based on a geometry partition, including determining the filter class based on a partition structure, from a plurality of partition structures, that is associated with a lowest sum of activity values;
determining a filter based on the filter class; and
applying the filter to the reconstructed block.

2. The method of claim 1, wherein determining the filter class using the classifier based on the geometry partition comprises:
determining respective sums of activity values for each partition structure of the plurality of partition structures, wherein each of the plurality of partition structures is defined by a respective angle and a respective offset distance;

determining the partition structure of the plurality of partition structures associated with the lowest sum of activity values of the respective sums of activity values; and determining the filter class based on the respective angle and respective offset distance associated with the partition structure of the plurality of partition structures associated with the lowest sum of activity values of the respective sums of activity values.

3. The method of claim 2, wherein determining the respective sums of activity values for each partition structure of a plurality of partition structures comprises:

determining respective first activity values for respective first partitions of the plurality of partition structures using samples of the block of video data in the respective first partitions;

determining respective second activity values for respective second partitions of the plurality of partition structures using samples of the block of video data in the respective second partitions; and adding the respective first activity values to the respective second activity values to determine the respective sums of activity values.

4. The method of claim 2, wherein each of the plurality of partition structures is defined by the respective angle and the respective offset distance in a function $f(x, y)=x \cos(\theta)-y \sin(\theta)+\rho$ relative to a boundary distance alpha (a), wherein $f(x, y)$ is a partitioning boundary of a partition structure, $\theta$ is the respective angle, and $\rho$ is the respective offset distance.

5. The method of claim 2, wherein determining respective sums of activity values comprises:

determining respective sums of activity values based on a horizontal gradient and a vertical gradient obtained using a 1D Laplacian.

6. The method of claim 2, wherein determining respective sums of activity values comprises:

determining respective sums of activity values based on a variance of samples.

7. The method of claim 2, wherein determining the filter class based on the respective angle and respective offset distance associated with the partition structure of the plurality of partition structures associated with the lowest sum of activity values of the respective sums of activity values comprises:

determining the filter class based on the respective angle and respective offset distance and an overall activity calculated for the block.

8. The method of claim 2, wherein determining the filter class based on the respective angle and respective offset distance associated with the partition structure of the plurality of partition structures associated with the lowest sum of activity values of the respective sums of activity values comprises:

determining the filter class based on the respective angle and respective offset distance and ratio of an overall activity calculated for the block and the lowest sum of activity values of the plurality of partition structures.

9. The method of claim 1, wherein the filter is an adaptive loop filter.

10. The method of claim 1, wherein coding comprises encoding, and wherein reconstructing the block of video data to generate the reconstructed block comprises:

reconstructing the block of video data in a reconstruction loop of a video encoding process to generate the reconstructed block.

11. The method of claim 1, wherein coding comprises decoding, and wherein reconstructing the block of video data to generate the reconstructed block comprises:

decoding the block of video data to generate the reconstructed block.

12. An apparatus configured to code video data, the apparatus comprising:

a memory configured to store a block of video data; and one or more processors in communication with the memory, the one or more processors configured to:

reconstruct the block of video data to generate a reconstructed block;

determine a filter class for the reconstructed block using a classifier based on a geometry partition, wherein the one or more processors are further configured to determine the filter class based on a partition structure, from a plurality of partition structures, that is associated with a lowest sum of activity values;

determine a filter based on the filter class; and apply the filter to the reconstructed block.

13. The apparatus of claim 12, wherein to determine the filter class using the classifier based on the geometry partition, the one or more processors are further configured to:

determine respective sums of activity values for each partition structure of the plurality of partition structures, wherein each of the plurality of partition structures is defined by a respective angle and a respective offset distance;

determine the partition structure of the plurality of partition structures associated with the lowest sum of activity values of the respective sums of activity values; and determine the filter class based on the respective angle and respective offset distance associated with the partition structure of the plurality of partition structures associated with the lowest sum of activity values of the respective sums of activity values.

14. The apparatus of claim 13, wherein to determine the respective sums of activity values for each partition structure of a plurality of partition structures, the one or more processors are further configured to:

determine respective first activity values for respective first partitions of the plurality of partition structures using samples of the block of video data in the respective first partitions;

determine respective second activity values for respective second partitions of the plurality of partition structures using samples of the block of video data in the respective second partitions; and add the respective first activity values to the respective second activity values to determine the respective sums of activity values.

15. The apparatus of claim 13, wherein each of the plurality of partition structures is defined by the respective angle and the respective offset distance in a function $f(x,y)=x \cos(\theta)-y \sin(\theta)+\rho$ relative to a boundary distance alpha (a), wherein $f(x, y)$ is a partitioning boundary of a partition structure, $\theta$ is the respective angle, and $\rho$ is the respective offset distance.

16. The apparatus of claim 13, wherein to determine respective sums of activity values, the one or more processors are further configured to:

determine respective sums of activity values based on a horizontal gradient and a vertical gradient obtained using a 1D Laplacian.

17. The apparatus of claim 13, wherein to determine respective sums of activity values, the one or more processors are further configured to:

determine respective sums of activity values based on a variance of samples.

18. The apparatus of claim 13, wherein to determine the filter class based on the respective angle and respective offset distance associated with the partition structure of the plurality of partition structures associated with the lowest sum of activity values of the respective sums of activity values, the one or more processors are further configured to:

determine the filter class based on the respective angle and respective offset distance and an overall activity calculated for the block.

19. The apparatus of claim 13, wherein to determine the filter class based on the respective angle and respective offset distance associated with the partition structure of the plurality of partition structures associated with the lowest sum of activity values of the respective sums of activity values, the one or more processors are further configured to:

determine the filter class based on the respective angle and respective offset distance and ratio of an overall activity calculated for the block and the lowest sum of activity values of the plurality of partition structures.

20. The apparatus of claim 12, wherein the filter is an adaptive loop filter.

21. The apparatus of claim 12, wherein to code the video data, the apparatus is configured to encode the video data, and wherein to reconstruct the block of video data to generate the reconstructed block, the one or more processors are further configured to:

reconstruct the block of video data in a reconstruction loop of a video encoding process to generate the reconstructed block.

22. The apparatus of claim 21, further comprising:

a camera configured to capture a picture that includes the block of video data.

23. The apparatus of claim 12, wherein to code the video data, the apparatus is configured to decode the video data, and wherein to reconstruct the block of video data to generate the reconstructed block, the one or more processors are further configured to:

decode the block of video data to generate the reconstructed block.

24. The apparatus of claim 23, further comprising:

a display configured to display a picture that includes the reconstructed block.

\* \* \* \* \*